United States Patent
Offenberg

(10) Patent No.: US 10,237,534 B2
(45) Date of Patent: Mar. 19, 2019

(54) IMAGING DEVICE AND A METHOD FOR PRODUCING A THREE-DIMENSIONAL IMAGE OF AN OBJECT

(71) Applicant: Infineon Technologies Dresden GmbH, Dresden (DE)

(72) Inventor: Dirk Offenberg, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 656 days.

(21) Appl. No.: 14/324,327

(22) Filed: Jul. 7, 2014

(65) Prior Publication Data

US 2016/0007009 A1    Jan. 7, 2016

(51) Int. Cl.

| H04N 13/204 | (2018.01) |
|---|---|
| H04N 13/257 | (2018.01) |
| G01S 17/02 | (2006.01) |
| G01S 17/89 | (2006.01) |
| H04N 13/254 | (2018.01) |
| H04N 13/207 | (2018.01) |

(52) U.S. Cl.
CPC ......... *H04N 13/257* (2018.05); *G01S 17/023* (2013.01); *G01S 17/89* (2013.01); *H04N 13/204* (2018.05); *H04N 13/207* (2018.05); *H04N 13/254* (2018.05)

(58) Field of Classification Search
CPC ....................... H04N 13/0257; H04N 13/0203
USPC ......................................................... 348/46
See application file for complete search history.

(56) References Cited

U.S. PATENT DOCUMENTS

| 2014/0253688 A1* | 9/2014 | Metz ....................... G01S 17/89 |
|---|---|---|
| | | 348/46 |
| 2014/0300718 A1* | 10/2014 | Krattiger .............. H04N 5/2354 |
| | | 348/68 |

FOREIGN PATENT DOCUMENTS

| DE | 44 39 298 A1 | 6/1996 |
|---|---|---|
| WO | WO 2009/124601 A1 | 10/2009 |

OTHER PUBLICATIONS

DE19944439298 Machine Translation.*

* cited by examiner

*Primary Examiner* — Nguyen T Truong
(74) *Attorney, Agent, or Firm* — Eschweiler & Potashnik, LLC

(57) ABSTRACT

An imaging device includes an image sensor circuit including a pixel element. The pixel element is configured to receive during a first receiving time interval electromagnetic waves having a first wavelength, and to receive during a subsequent second receiving time interval electromagnetic waves having a second wavelength. The imaging device includes an image processing circuit configured to produce a color image of the object based on a first pixel image data and a second pixel image data. The first pixel image data is based on the electromagnetic waves having the first wavelength received by the pixel element during the first receiving time interval. The second pixel image data is based on the electromagnetic waves having the second wavelength received by the pixel element during the second receiving time interval.

18 Claims, 5 Drawing Sheets

IMAGING DEVICE AND A METHOD FOR PRODUCING A THREE-DIMENSIONAL IMAGE OF AN OBJECT

TECHNICAL FIELD

Embodiments relate to producing color images and in particular to imaging devices, a method for producing a color image of an object and a method for producing a three-dimensional image of an object.

BACKGROUND

In cameras and imaging devices, each pixel of an image sensor requires color sub-pixels to filter light entering the camera into separate colors. As a result, image sensors using color filters suffer from a reduction in resolution. Problems caused by color artifacts during the imaging of high contrast objects are often tolerated. Time-of-flight (TOF) measurements for producing three-dimensional (3D) images suffer from limited range, relatively large pixels, low resolution, high power consumption, complex evaluation circuits and complex evaluation algorithms. It is desired to provide imaging devices which produce color images with improved resolution and reduced color artifacts. It is also desired to provide imaging devices which simplify the process of producing 3D color images with minimal errors.

SUMMARY

Some embodiments relate to an imaging device. The imaging device includes an image sensor circuit comprising a pixel element. The pixel element is configured to receive during a first receiving time interval electromagnetic waves having a first wavelength. The electromagnetic waves having the first wavelength are emitted by a light emitting device and reflected by an object. The pixel element is configured to receive during a subsequent second receiving time interval electromagnetic waves having a second wavelength. The electromagnetic waves having the second wavelength are emitted by the light emitting device and reflected by the object. The image device further includes an image processing circuit configured to produce a color image of the object based on a first pixel image data and a second pixel image data. The first pixel image data is based on the electromagnetic waves having the first wavelength received by the pixel element during the first receiving time interval. The second pixel image data is based on the electromagnetic waves having the second wavelength received by the pixel element during the second receiving time interval.

Some embodiments relate to an imaging device. The imaging device is an image sensor circuit including an array of pixel elements. Each pixel element in the array of pixel elements is configured to produce a first pixel image data based on electromagnetic waves having a first wavelength received during a first receiving time interval. The electromagnetic waves having the first wavelength are emitted by a light emitting device and reflected by an object. Each pixel element is further configured to produce a second pixel image data based on electromagnetic waves having a second wavelength received during a second receiving time interval. The electromagnetic waves having the second wavelength are emitted by the light emitting device and reflected by the object. The imaging device further includes an image processing circuit configured to produce a color image of the object based on the first pixel image data and the second pixel image data from each pixel element in the array of pixel elements.

Some embodiments relate to a method for producing a three-dimensional image of an object. The method includes modulating a visible light source external to a time of flight camera to emit modulated electromagnetic waves based on a modulation control signal generated by the time of flight camera. The method may further include receiving by the time of flight camera the modulated electromagnetic waves reflected by an object, and producing a three-dimensional image of the object based on the received modulated electromagnetic waves, wherein the received modulated electromagnetic waves are emitted by visible light source and reflected by the object.

Some embodiments related to a method for producing a color image of an object according to various embodiments. The method includes receiving, by a pixel element of an image sensor circuit, during a first receiving time interval electromagnetic waves having a first wavelength, the electromagnetic waves having the first wavelength emitted by a light emitting device and reflected by an object. The method further includes receiving, by the pixel element, during a subsequent second receiving time interval electromagnetic waves having a second wavelength, the electromagnetic waves having the second wavelength emitted by the light emitting device and reflected by the object. The method further includes producing, by an image processing circuit, a color image of the object based on a first pixel image data and a second pixel image data, wherein the first pixel image data is based on the electromagnetic waves having the first wavelength received by the pixel element during the first receiving time interval, and wherein the second pixel image data is based on the electromagnetic waves having the second wavelength received by the pixel element during the second receiving time interval.

BRIEF DESCRIPTION OF THE FIGURES

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
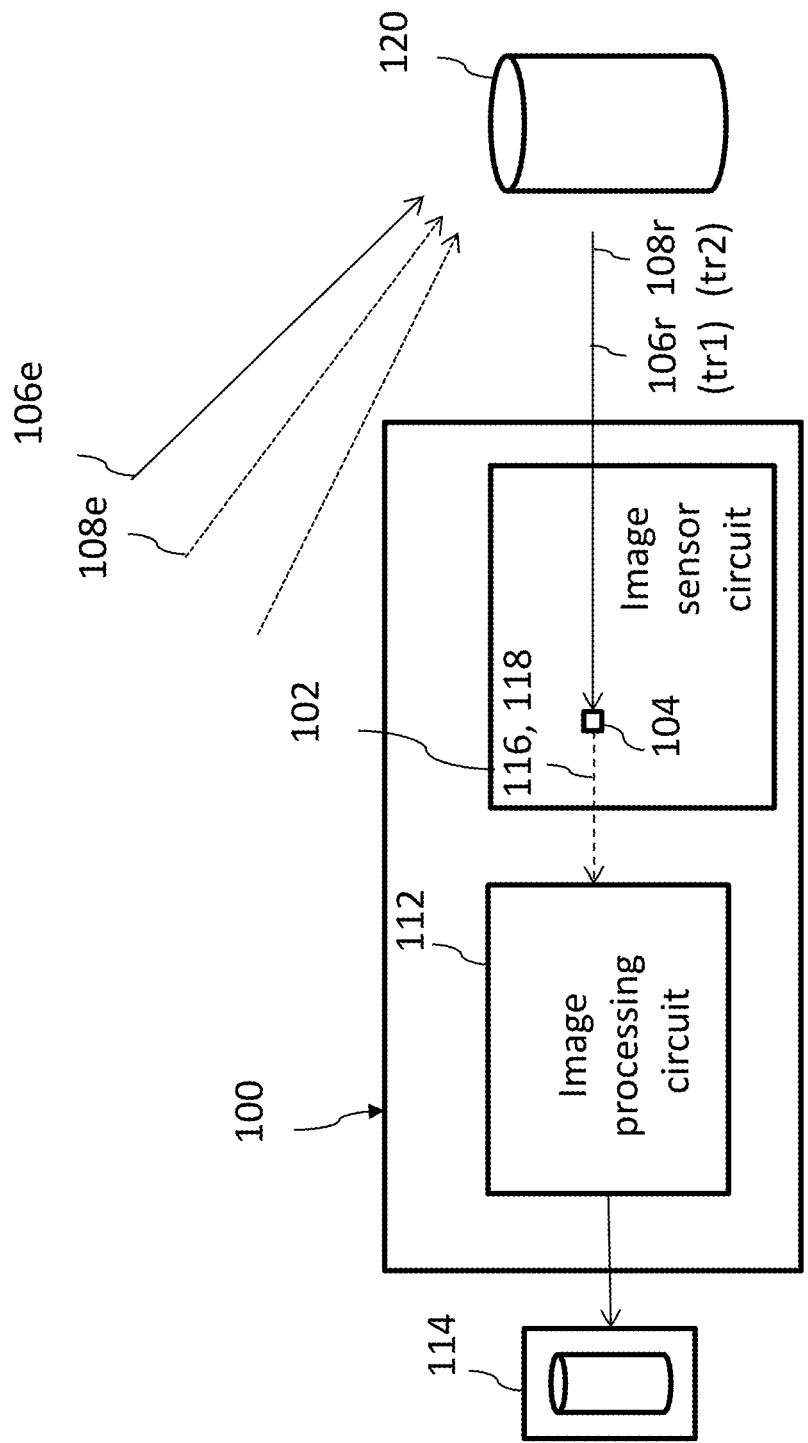
FIG. 1 shows a schematic illustration of an imaging device according to various embodiments.

FIG. 1 shows a schematic illustration of an imaging device 100 according to an embodiment. The imaging device 100 includes an image sensor circuit 102. The image sensor circuit 102 includes a pixel element 104. The pixel element 104 is configured to receive during a first receiving time interval electromagnetic waves having a first wavelength 106r. The electromagnetic waves having the first wavelength 106r are emitted by a light emitting device and reflected by an object 120. The pixel element is configured to receive during a subsequent second receiving time interval electromagnetic waves having a second wavelength 108r. The electromagnetic waves having the second wavelength 108r are emitted by the light emitting device and reflected by the object 120.

The imaging device 100 includes an image processing circuit 112 configured to produce a color image 114 of the object based on a first pixel image data 116 and a second pixel image data 118. The first pixel image data 116 is based on the electromagnetic waves having the first wavelength 106r received by the pixel element 104 during the first receiving time interval. The second pixel image data 118 is based on the electromagnetic waves having the second wavelength 108r received by the pixel element 104 during the second receiving time interval.

Due to the implementation of the pixel element receiving the electromagnetic waves 106r, 108r during a first receiving time interval and a second receiving time interval respectively, a higher pixel resolution may be achieved. For example, instead of using color filters for the spectral separation of received light like image sensors, full color information about the object may be determined based on successive illumination or lighting of the object with different colors. A pixel element for different color filters may be avoided, for example. For example, the size of each pixel element may be reduced.

An imaging device 100 may be a camera. For example, the camera may include a lens arrangement through which light enters the camera, a shutter arrangement which when open allows an image to be produced, and/or an aperture arrangement which controls the amount of light reaching the image sensor circuit 102.

The object 120 may be a person, or thing, or scenery to be photographed, for example. For example, the object 120 may be three-dimensional and/or may have color.

The image sensor circuit 102 may include an array of pixel elements such as a two-dimensional array of pixel elements. The pixel element 104 may be one in the array of pixel elements included by the image sensing circuit 102.

Each pixel element 104 may include a photodetection circuit for the detection of light. For example, the photodetection circuit may include a generation zone, e.g. a photosensitive region, such as a depletion region or space charge region, where photogenerated charge carriers may be generated. The photogenerated charge carriers may include positive charge-carriers, e.g. holes, or negative charge-carriers, e.g. electrons, for example. The photodetection circuit may be implemented for example by a photodiode. The number of photogenerated charge carriers generated in each individual pixel element 104 may be proportional to the intensity of the electromagnetic waves reflected by the object and received by that pixel element 104. Each pixel element 104 of the image sensor circuit 102 may produce pixel image data, which may be based on an electrical signal, e.g. a voltage signal or current signal proportional to the number of photogenerated charge carriers generated by the pixel element.

Various operating modes may be used by the image sensor circuit 102 for producing the photogenerated charge carriers and for converting the optical information into electrical information. For example, the image sensor circuit 102 according to some embodiments may be configured as a charge-coupled device (CCD). In other embodiments, the image sensor circuit may be configured as a complementary metal oxide semiconductor (CMOS) imaging circuit. In CMOS imaging circuits, the conversion of the photogenerated charges in a pixel element 104 into an electrical signal may be carried out by the pixel element 104 itself. In CCD circuits, the conversion of photogenerated charges into an electrical signal may take place elsewhere in the image sensor circuit 102 other than in the pixel element 104. In both arrangements, the pixel image data produced by the image sensor circuit 102 may be transmitted to the image processing circuit 112 for further processing.

The pixel element 104 may receive during a first receiving time interval, tr1, electromagnetic waves having the first wavelength 106r. Subsequently, the pixel element 104 may receive during a subsequent second receiving time interval, tr2, electromagnetic waves having the second wavelength 108r. Subsequently, the pixel element 104 may receive during a subsequent third receiving time interval, tr3, electromagnetic waves having the third wavelength.

The image sensor circuit 102 may produce pixel image data based on the intensity or amount of photogenerated charge carriers generated in each pixel element. For example, the image sensor circuit 102 may produce first pixel image data 116 based on the number of photogenerated charge carriers generated in the pixel element 104 by the received electromagnetic waves having the first wavelength 106r, e.g. light of a first color, during the first receiving time interval, tr1. In other words, the first pixel image data 116 may be based on the electromagnetic waves having the first wavelength 106r received by the pixel element 104 during the first receiving time interval, tr1.

Subsequently, the image sensor circuit 102 may produce second pixel image data 118 based on the number of photogenerated charge carriers generated in the pixel element 104 by the received electromagnetic waves having the second wavelength 108r, e.g. light of a second color, during the second receiving time interval, tr2. In other words, the second pixel image data 118 may be based on the electromagnetic waves having the second wavelength 108r received by the pixel element 104 during the second receiving time interval, tr2.

Subsequently, the image sensor circuit 102 may produce third pixel image based on the number of photogenerated charge carriers generated in the pixel element 104 by the received electromagnetic waves having the third wavelength, e.g. light of a third color, during the third receiving time interval. In other words, the third pixel image data may be based on the electromagnetic waves having the third wavelength received by the pixel element 104 during the third receiving time interval.

The received electromagnetic waves having the first 106r, second 108r and third wavelength may be emitted by active lighting or by a light emitting device and reflected by an object to be photographed. In order to suppress unwanted background light, images with and without active color lighting may be taken or produced and the color information may be determined from a difference signal using the principles of a lock-in amplifier.

For example, in order to determine and suppress unwanted background light, the pixel element 104 may further receive during a subsequent, e.g. fourth, receiving time interval, ambient light reflected by the object 120. In other words, fourth pixel image data may be produced without any active lighting. In other words, the light emitting device may not emit any light for the production of fourth pixel image data. The image sensor circuit 102 may produce fourth pixel image data based on the number of photogenerated charge carriers generated in the pixel element 104 by the ambient light during the fourth receiving time interval. In other words, the fourth pixel image data may be based on the ambient light received by the pixel element 104 during the fourth receiving time interval.

The successively produced first pixel image data 116, second pixel image data 118, third pixel image data and fourth pixel image data may be transmitted successively to the image processing circuit 112.

The image processing circuit 112 may combine the first pixel image data 116, second pixel image data 118, third pixel image data and the fourth pixel image data to produce the final color image 114. In other words, the image processing circuit 112 may produce the color image 114 of the object 120 based on the first pixel image data 116, second pixel image data 118, third pixel image data and fourth pixel image data. The image processing circuit 112 may produce the color image 114 or an additional brightness image of the object 120 based on the fourth pixel image data.

For example, the image processing circuit 112 may produce the color image 114 based on a summation (or overlapping) of first pixel image data 116, second pixel image data 118 and third pixel image data. The fourth pixel image data may be used to remove unwanted background light from the first pixel image data 116, second pixel image data 118 and the third pixel image data, by a subtraction. For example, the image processing circuit 112 may further include a circuit configured to produce the color image 114 of the object 120 based on a subtraction of the pixel image data produced without active lighting from the pixel image data produced with active lighting. For example, the pixel image data produced without active lighting may be subtracted from each of the pixel image data produced with active lighting. The pixel image data produced with active lighting (from the light emitting device 220) as described above may refer to first pixel image data 116, second pixel image data 118 and third pixel image data. The pixel image data produced without active lighting (only ambient light) as described above may refer to fourth pixel image data. For example, the circuit may be configured to produce the color image 114 of the object 120 based on a subtraction of the fourth pixel image data from the first pixel image data.

Due to the implementation described above in which pixel image data with active lighting and pixel image data without active lighting may be produced, unwanted background light may be suppressed and the color information of the color image may be determined easily by a difference signal, i.e. subtraction of the pixel image data produced without active lighting from the pixel image data produced with active lighting.

The image processing circuit 112 may include a lock-in amplifying circuit 224 (see FIG. 2) for the demodulation of the received electromagnetic waves 106r, 108r, 110r. The lock-in amplifying circuit 224 may be implemented as an analogue circuit or a digital circuit and may be connected to a modulation control circuit 226 (See FIG. 2). The lock-in amplifying circuit may obtain intensity information of the pixel image data based on the pixel image data and the modulation control signal from the modulation control circuit 226. For example, the lock-in amplifying circuit may demodulate the intensity information of the pixel image data based on a high-frequency modulation control signal of the modulation control circuit 226. In this manner, the lock-in amplifying circuit may obtain intensity information of the first pixel image data 116 based on the first pixel image data 116 and the modulation control signal. In this manner, the lock-in amplifying circuit may obtain intensity information of the subsequent pixel image data, 118, based on subsequent pixel image data 118, and the modulation control signal.

Due the implementation of the image processing circuit 112 including the lock-in amplifying circuit for the demodulation of the received electromagnetic waves 106, 108r, 110r, increased accuracy of the measurement of intensity information of the pixel image data may be achieved.

The obtained intensity information may be used by the image processing circuit 112 to produce the color image 114 based on intensity information of the first pixel image data 116, second pixel image data 118, third pixel image data and a fourth pixel image data, for example.

The sequence of image acquisition and the number of images with and without active lighting in proportion to the number of images with active lighting may be varied and dynamically adapted, for example.

It may be understood that various embodiments are not necessarily be limited to the imaging sequence described above and may be varied. First pixel image data 116, second pixel image data 118, third pixel image data and fourth pixel image data may be obtained respectively by red active lighting, green active lighting, blue active lighting and ambient light, for example. For example, the scenery may first be illuminated with a red LED followed by a green LED, followed by a blue LED and an intensity image may be recorded for each. In other examples, first pixel image data 116, second pixel image data 118, third pixel image data and fourth pixel image data may be obtained respectively by red active lighting, blue active lighting, ambient light, green active lighting, for example. Furthermore, an image without active lighting may be recorded. The overlapping of the images leads to a color image including distance information and the unwanted background light may be calculated or determined based on the image without active lighting.

In some embodiments, wavelengths other than those mentioned thus far may be implemented in the light emitting device 200 for producing the pixel image data. For example, in some embodiments, a different color combination may be used. The colors in a color combination may be complementary colors. For example, a complementary color combination of cyan, magenta, and yellow light may be used instead of a complementary color combination of red, blue, and green light. In some embodiments, fewer or more than the three colors described in these embodiments may be used.

In some embodiments, the ratio of the number of pixel image data without active lighting (only ambient light) to the number of pixel image data produced with active lighting (colored light of different wavelengths) may also be varied and dynamically adapted if needed. For example, in embodiments described above, one pixel image data without active lighting is produced for every three pixel image data taken with active lighting. This ratio of 1:3 may be varied as required.

In some embodiments, the imaging sequence described above may be repeated, so that a plurality of pixel image data (e.g. first pixel image data 116, second pixel image data 118, third pixel image data and fourth pixel image data) may be successively produced very often and very fast. For example, the repetition of the image acquisition sequence may be carried out very often and very fast. For example, it may be possible to repeat the image acquisition sequence more than one hundred times in a fraction of a second. The repeated processing improves the quality of the color image 114 and reduces noise. Furthermore, artifacts caused by motion may be reduced. In some embodiments, pixel image data based on electromagnetic wavelengths having a certain wavelengths may be produced more often than electromagnetic wavelengths having another wavelength.

Other image sensors for producing color images may use color filters over individual pixels so that the different pixels are sensitive to different colors. The pixels for different colors lie next to each other. For example, each pixel may include a 2×2 arrangement four color sub-pixels, e.g. red, blue and green. The color filters allow the transmission of light of a first wavelength, but block the transmission of all other wavelengths. Furthermore, this results in a reduction in resolution as a pixel requires a plurality of color pixels to produce full color information. Furthermore, color artifacts produced by high contrast objects are often observed. Unlike such image sensors, the pixel element 104 may receive the electromagnetic waves having different wavelengths at the same electromagnetic wave receiving area of the pixel element. In other words, the pixel element 104 of a proposed imaging device may receive during the first receiving time interval, tr1, the electromagnetic waves having the first wavelength 106r and during the subsequent second receiving time interval, tr2, the electromagnetic waves having the second wavelength 108r at a same electromagnetic wave receiving area of the pixel element 104. In other words, no part or portion of the electromagnetic wave receiving area may be used for transmitting electromagnetic waves having a first wavelength while blocking electromagnetic waves having other wavelengths to be detected before or after.

The electromagnetic waves having the different wavelengths may be received by the pixel element 104 through a common light path. For example, the common light path may include an entry path through the lens arrangement to the image sensor circuit 102. The common light path may be passable to electromagnetic waves of the first wavelength 106r and the electromagnetic waves of the second wavelength 108r during the first receiving time interval, tr1, and the second receiving time interval, tr2. In other words, the electromagnetic waves having the first wavelength 106r and the electromagnetic waves having the second wavelength 108r may be received by the pixel element 104 through a common light path. In other words, the light path travelled by electromagnetic waves having the first wavelength 106r to reach the pixel element 104 may be identical to the light path travelled by the electromagnetic waves having the second wavelength 108r to reach the pixel element 104. Upon reaching the pixel element 104, the electromagnetic waves having the first wavelength 106r and the electromagnetic waves having the second wavelength 108r may be received at an identical electromagnetic wave receiving area.

The electromagnetic wave receiving area of the pixel element 104 may define the smallest unit area used by the image sensor circuit 102 for receiving the electromagnetic waves and hence obtaining the first pixel image data 116 and the second pixel image data 118, for example. In other words, the pixel element 104 is not subdivided into further sub-pixels, for example. For example, the number of pixel elements used for obtaining pixel image data for the produced color image of the object is equal to a number of pixels of the produced color image 114 of the object 120. In other words, a resolution of the produced color image may be equal to a number of pixel elements of the image sensor circuit 102.

Due to the above implementation, pixel resolution may be improved as the electromagnetic waves of different wavelengths are received by a shared, identical electromagnetic wave receiving area. Furthermore, as the receiving of electromagnetic waves of different wavelengths each arrive sequentially, the same photodetector per pixel element may be used to receive and produce the intensity data for each pixel element, and multiple photodetectors for each wavelength of light may no longer be necessary.

It may be desired in some instances to produce, in addition to or instead of a two-dimensional color image, a three-dimensional image of an object. For example, it may be desired to produce a three-dimensional color image or an uncolored three-dimensional image. According to some embodiments, the imaging device 100 may include a photonic mixing device (PMD). For example, the pixel element 104 may be configured as a PMD circuit to produce pixel image data including both intensity information and distance information from each respective received electromagnetic wave. Pixel image data including both intensity information and distance information may be processed by the image processing circuit 112 to produce the final image which may be a three-dimensional color image.

For example, the pixel element (or each pixel element) of the image sensor circuit may be implemented as a PMD device including two transparent charge collectors, i.e. photogates, working in alternating bias. By synchronizing the illumination source with a modulation control signal, the illumination source may be configured to generate a plurality of light pulses, e.g. infra-red or visible light, at a modulation frequency of the modulation control signal. The reflected light pulses may be received by the image sensor circuit of the PMD device which measures the phase delay of the received signal with respect to the plurality of light pulses generated by the illumination source. The frequency of the alternating bias (push-pull signal pulses) applied to the two photogates may be based on the modulation frequency of the modulation control signal which may be also used for modulation of the illumination source. The alternatingly biased photogates may alternatingly receive the light pulses emitted by the illumination source and reflected by an object. As the received light is also modulated with the same signal as the PMD image sensor circuit, the difference in the electrical signal output from the first photogate and the second photogate may be directly dependent on the phase delay between the illumination source and the PMD image sensor circuit and may be represented by the correlation function. This data can be used to calculate the distance from the object to the image sensor circuit, wherein the distance calculated is proportional to the phase shift divided by the modulation frequency, for example. For example, the alternating bias signal of the PMD device may be applied consecutively with different phase offsets or the light emitted by the illumination source may be amplitude modulated and emitted consecutively with different phase offsets. The phase delay between the illumination source and the PMD image sensor circuit may be determined based on the different phase offsets (e.g. by identifying the phase offset corresponding to a maximal detected current or voltage).

The distance information of the pixel image data may be based on a phase delay between the electromagnetic waves emitted during an emitting time interval by a light emitting device and the corresponding electromagnetic waves received by the pixel element 104 during a receiving time interval. For example, the distance information of the first pixel image data 116 may be based on a phase delay between the electromagnetic waves having the first wavelength 106e emitted during a first emitting time interval, te1, by the light emitting device 220 and the electromagnetic waves having the first wavelength 106r received during the first receiving time interval, tr1.

An autocorrelations function used in TOF cameras may be determined The distance information is held in the phase of the autocorrelations function, while the color information is held in the amplitude of the autocorrelations function, for example. Both the intensity information and the distance information of the first pixel image data 116 may be determined based on an autocorrelations function, for example. The autocorrelations function may be based on the modulation control signal and a signal proportional to the electromagnetic waves having the first wavelength received by the pixel element, such as a photocurrent, or voltage or resistance signal for example. The autocorrelations function may be based on the modulation control signal and demodulated received electromagnetic waves 106r, 108r, 110r, for example. For example, the first pixel image data 116 and second pixel image data 118 may each include both intensity information and distance information corresponding to the received electromagnetic waves having the first wavelength 106r and the electromagnetic waves having the second wavelength 108r respectively.

The image processing circuit 112 may produce the (three-dimensional) color image 114 or an additional three-dimensional image based on the distance information of the pixel image data. For example, the image processing circuit 112 may produce the color image 114 or an additional three-dimensional image based on the distance information of the first pixel image data 116 and second pixel image data 118 respectively. For example, the image processing circuit 112 may produce the color image 114 or the additional three-dimensional image by the summation (or overlapping) of first pixel image data 116 and second pixel image data 118. The overlapping of the images leads to a color image including distance information. The unwanted background light is no longer held in the autocorrelations function.

Figure 2:
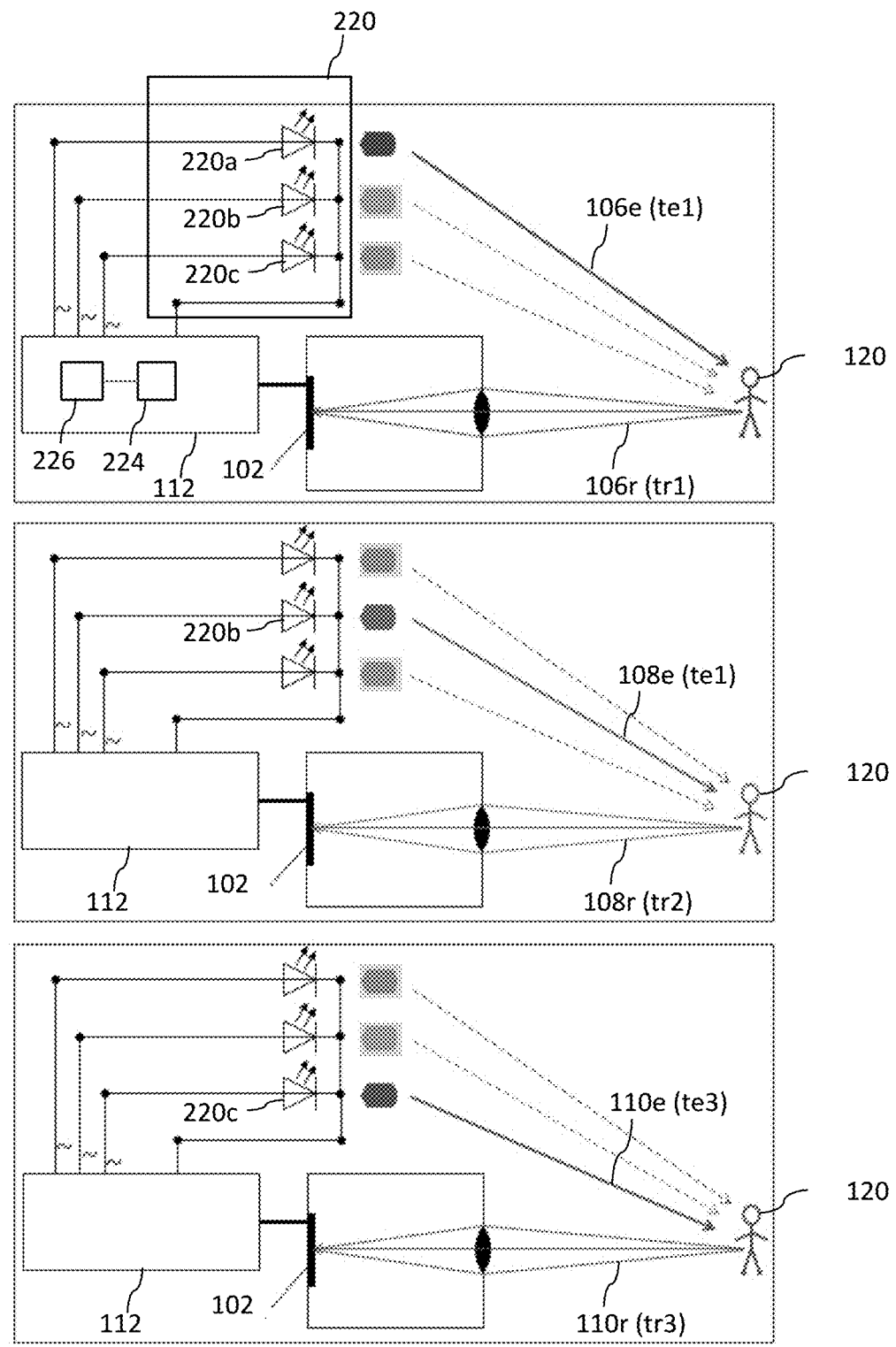
FIG. 2 shows a schematic illustration of an imaging device configured to produce an image according to various embodiments.

FIG. 2 shows a schematic illustration of the imaging device 100 according to various embodiments.

An operator of imaging device 100 may trigger the release of the shutter arrangement, indicating that an image of the object 120 should be produced by the imaging device, for example. Upon release of the shutter, the light emitting device 220 may illuminate the object or scenery, successively with electromagnetic waves having a first wavelength 106e, electromagnetic waves having a second wavelength 108e, and electromagnetic waves having a third wavelength 110e, in succession. For example, the light emitting device 220 may emit during a first emitting time interval, te1, electromagnetic waves having a first wavelength 106e, which may be visible light of a first color e.g. red light having a wavelength between 620 to 750 nm. Subsequently, the light emitting device 220 may emit during a subsequent second emitting time interval, te2, electromagnetic waves having a second wavelength 108e, which may be visible light of a second color e.g. green light having a wavelength between 495 to 570 nm. Subsequently, the light emitting device 220 may also emit during a subsequent third emitting time interval, te3, electromagnetic waves having a third wavelength 110e, which may be visible light of a third color e.g. blue light having a wavelength between 450 to 495 nm.

The light emitting device 220 may include a first light emitting source 220a for emitting the electromagnetic waves having the first wavelength 106e, a second light emitting source 220b for emitting the electromagnetic waves having the second wavelength 108e and a third light emitting source 220c for emitting the electromagnetic waves having the third wavelength 110e. In one configuration, light emitting device 220 may include a light emitting diode arrangement which may include a first light emitting diode (LED) 220a, e.g. a red LED, a second light emitting diode 220b, e.g. a green LED, and a third light emitting diode 220c, e.g. a blue LED. In other configurations, laser diodes may be used instead of LEDs, for example.

As described in relation to embodiments above, the imaging sequence procedure may be repeated multiple times, for example to improve the quality and reduce noise. The image acquisition, so that the plurality of pixel image data (e.g. first pixel image data 116, second pixel image data 118, third pixel image data and fourth pixel image data) may be successively produced very often and very fast to improve quality and to reduce noise. The image processing circuit 112 may include a modulation control circuit 226 configured to provide a modulation control signal to the light emitting device 220. The modulation control signal may be used for controlling a modulation (e.g. amplitude/intensity modulation) of the electromagnetic waves emitted by the light emitting device 220.

The modulation control circuit 226 may provide a modulation control signal to the light emitting device 220 for controlling a modulation of the electromagnetic waves having the first wavelength 106e, the electromagnetic waves having the second wavelength 108e and the electromagnetic waves having the third wavelength 110e emitted by the light emitting device 220. The modulation control signal may be a high frequency signal, for example. The modulation control signal may have a frequency greater than 1 MHz, or greater than tens of MHz, for example. For example, the modulation frequency may range from about 1 MHz to about 5 MHz or from about 1 MHz to about 10 MHz or from about 1 MHz to about 20 MHz or higher, which may result in emitting and receiving time intervals ranging from about 1 µs to about 200 ns or from about 1 µs to about 100 ns or from about 1 µs to about 50 ns or less. For example, the modulation control circuit 226 may modulate electromagnetic waves from the first light emitting source 220a with the modulation control signal. The electromagnetic waves 106e, 108e, 110e emitted by the light emitting device 220, are therefore modulated electromagnetic waves modulated by the modulation control signal, for example. The frequency of the modulation control signal for modulating the electromagnetic waves having the first wavelength 106e during the first time interval and for modulating the electromagnetic waves having the second wavelength 108e during the second time interval may be equal or may differ from each other.

The successively transmitted electromagnetic waves having the first wavelength 106e, the second wavelength 108e and the third wavelength 110e respectively, may each be successively reflected by the object and subsequently, the reflected electromagnetic waves 106r, 108r, 110r may be successively received by the image sensor circuit 112 of the imaging device 100.

The modulation of the LEDs may be respectively synchronized with the PMD of the pixel elements. The modulation of the emission of the electromagnetic waves having the different wavelengths, e.g. 106e, 108e, 110e, may each be respectively synchronized with the PMD of each pixel so that intensity information and distance information about the object 120 may be accurately produced by the pixel element 104.

Due to the above implementation, where the colored lighting is modulated by the high frequency modulation control signal, and the modulation of the channels may be synchronized with the autocorrelations function in the PMD, color information may be obtained from the difference in data of each channel, and unwanted background light may be suppressed. Furthermore, properties of the active lighting are known. Hence, results of image acquisition may be less dependent on the conditions of the light around the object or scenery. Thus, regular white-balancing correction may no longer be necessary to ensure that the color and the color temperature are depicted correctly, for example. In other words, regular white-balancing correction processes, such as full automatic balance, manual white-balance, software based white-balance, white-balance bracketing, which are complex, costly (particularly with manual white-balance) and produce sub-optimal results, may be dispensed with, for example.

While the embodiments above describe how intensity (color) information and distance information can be produced at the same time by the pixel element 104 using the autocorrelations function, in other embodiments, other operations mode sequences may be applied. For example, it may possible that the intensity information and the distance information sequentially determined, i.e. intensity and distance information may be produced by the pixel element 104 at different times, e.g. in a different sequence.

For example, in some embodiments, the first pixel image data 116 may include only distance information, while the second pixel image data 118 and third pixel image data may each include only intensity information. The distance information of the first pixel image data 116 may be based on a phase-delay of the received electromagnetic waves having the first wavelength 106r, whereas the intensity information of the second pixel image data 118 and the third pixel image data respectively may be based on the intensity of the electromagnetic waves having the second wavelength 108r and the electromagnetic waves having the third wavelength 110r respectively.

The decision as to which wavelength of the electromagnetic waves to be used to produce the distance information may be made based on the threshold modulation frequency, e.g. a maximal possible modulation frequency of the light emitting sources 220a, 220b, 220c. For example, the determination of the distance information may be carried out using the colored LEDs, e.g. all of the colored LEDs. Alternatively, only one LED may be used for determining distance information. For example, only one LED, e.g. 220a, may be used to determine distance information as the other LEDs may not be able to be modulated above 1 MHz, for example. In other embodiments, an additional light source may be used to determine the distance information (e.g. infra-red LED, infra-red laser diode).

In some embodiments, a single image sensor, e.g. image sensor circuit 102, may be used to produce both the color image and the TOF 3D image. The single image sensor, e.g. image sensor circuit 102, may be formed in a single semiconductor die, for example. This implementation may be used if electromagnetic waves in the visible spectrum, i.e. electromagnetic waves having a wavelength ranging from approximately 350 nm to approximately 750 nm, may be received by the image sensor circuit to produce intensity information and distance information to produce the color image and the 3D image. In these embodiments, the photodetection electromagnetic waves of each respective wavelength 106r, 108r, 110r for both intensity information and distance information may be carried out by the same photodetector, e.g. by the same photodiode, in the same pixel element 104.

A mode of color image acquisition may be used in a special operations mode of a TOF sensor camera. The colored light sources, e.g. LEDs and/or laser diodes, may be used for the operation in TOF mode, or an additional infra-red light source may be used, for example.

For example, to reduce the use of active lighting which may be visible to the human eye, in some embodiments, the imaging device 100 may further include an infra-red emitting circuit configured to emit during a further emitting time interval, infra-red electromagnetic waves, which are invisible to the human eye, i.e. electromagnetic waves having a wavelength from approximately 700 nm to 1 mm. The infra-red electromagnetic waves may be used to determine distance information to produce a 3D image using TOF measurements. In other words, distance information from pixel image data may be produced from receiving infra-red electromagnetic waves. In some embodiments, the infra-red emitting circuit may be configured as an infra-red LED. In some embodiments, the infra-red emitting circuit may be configured as an infra-red laser diode. The distance information of the pixel image data may be based on a phase-delay of the infra-red electromagnetic waves.

In some embodiments, more than one, e.g. two or more, image sensor circuits may be used. The two or more image sensor circuits may be formed on two or more different semiconductor dies, for example. For example, in embodiments where visible electromagnetic waves are used for determining color information and where infra-red electromagnetic waves are used for determining distance information, a first image sensor, e.g. image sensor circuit 102, may be used to produce a color image and a second image sensor may be used to produce a time-of-flight (TOF) 3D image.

In some embodiments, where visible electromagnetic waves are used for determining intensity information and where infra-red electromagnetic waves are used for determining TOF distance information, a single image sensor, e.g. image sensor circuit 102, may be implemented. In other words, different pixels are used for different functions in a single image sensor. For example, there may be pixels for the color (e.g. red, green blue) and pixels for TOF information. For example, the image sensor circuit 102 may include a first array of pixels for obtaining intensity (color) information and a second array of pixels for obtaining distance (3D) information. For example, a single pixel sensor may include a first pixel element 104 for color information, (e.g. receiving electromagnetic waves in the visible spectrum) and a second pixel element for obtaining distance information, (e.g. receiving electromagnetic waves in the infra-red spectrum).

In an implementation of this pixel arrangement, the pixels may overlap in a single image sensor. For example, the pixels for TOF information may lie under the color pixels. For example, the second pixel element for the TOF information may lie under the first pixel element for color information 104. Therefore, the lateral size of pixel element 104 is not laterally affected, for example. This arrangement may be used if the TOF information is determined through the use of infra-red electromagnetic waves which have a higher penetration depth in silicon, for example. Due to the difference in near-surface photocurrent generation and photocurrent generation deeper in the substrate, the color information and distance information may be read out separately from the same image sensor circuit 102 (the same pixel sensor).

The pixel element 104 of the image sensor circuit 102 may include a first photodetector arranged within the pixel element 104 to receive and detect respectively electromagnetic waves 106r, 108r, 110r, i.e. visible light of different wave lengths, emitted by the light emitting device 220 and reflected by object 120. For example, the first photodetector my receive electromagnetic waves having a first wavelength 106r including visible light of a first color during the first receiving time interval. In other words, the spectrum of electromagnetic waves received during the first receiving time interval may include a maximum of the first color. The first photodetector may produce sequentially intensity information of the first 116, second 118 and third pixel image data for producing the color image 114. The first photodetector may also receive and detect ambient light to produce fourth pixel image data as describe above with respect to various embodiments.

The pixel element 104 may receive during the further receiving time interval the infra-red electromagnetic waves emitted by the infra-red emitting circuit and reflected by the object 120. The pixel element 104 may further include a second photodetector to produce the distance information of the pixel image data for producing a three-dimensional image. The image sensor circuit 102 may include a second photodetector arranged within the pixel element 104 to receive and detect infra-red electromagnetic waves emitted by the infra-red emitting circuit 220 and reflected by the object 120. The second photodetector may produce the distance information of a fifth pixel image data for producing the color image 114. The fifth pixel distance image data may be based on a phase delay between the infra-red electromagnetic waves emitted by the infra-red light emitting device during the further emitting time interval and the infra-red electromagnetic waves received by the pixel element 104 during the further receiving time interval.

The TOF 3D image and the color image may be assembled or merged together using various electronic processes. The image processing circuit 112 may produce the color image or an additional three-dimensional image or a three-dimensional color image based on (fifth) pixel distance image data. The (fifth) pixel distance image data may be based on the infra-red electromagnetic waves received by the pixel element 104 during the further receiving time interval. For example, the image processing circuit 112 may produce the color image or the additional three-dimensional image, or the three-dimensional color image by summation or overlapping of the first 116, second 118, third, fourth and fifth pixel image data. As described above, the fourth pixel image data carrying ambient light information may be used to remove unwanted background light.

Due to the implementation of using successive turning on of active lighting and/or the exclusive use of ambient lighting to produce information about the background light, high contrast and low noise brightness image may be obtained. Special operation modes used by PMD for TOF measurements such as the suppression of background illumination (SBI) function may be dispensed with, for example. The SBI function may prevent the pixel from reaching saturation by intensive background light (greater than 150klux) which may result in a loss in color information. The SBI circuit can be used to control the dynamic range by which color images may be taken.

More details and aspects are mentioned in connection with the embodiments described above or below (e.g. regarding the imaging device, the image sensor circuit, the pixel element, the pixel image data and the image processing circuit). The embodiment shown in FIG. 2 may comprise one or more optional additional features corresponding to one or more aspects mentioned in connection with the proposed concept or one or more embodiments described above (e.g. FIG. 1) or below (e.g. FIG. 3 and FIG. 4).

Figure 3:
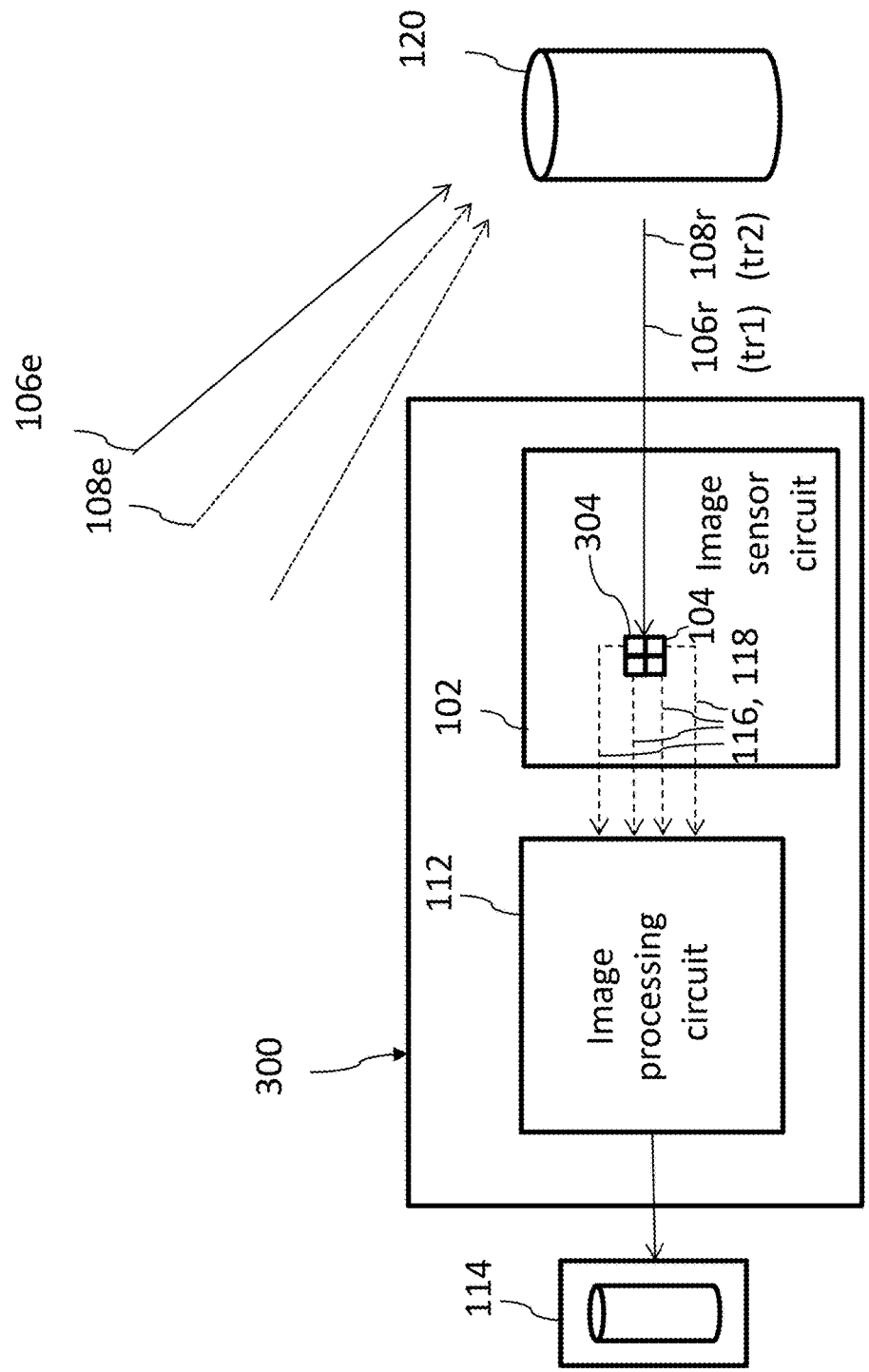
FIG. 3 shows a schematic illustration of an imaging device according to various embodiments.

FIG. 3 shows a schematic illustration of an imaging device 300 according to various embodiments.

The imaging device 300 may include an image sensor circuit 102 including an array of pixel elements 304. Each pixel element 104 in the array of pixel elements 304 may be configured to produce a first pixel image data 116 based on electromagnetic waves having a first wavelength 106r received during a first receiving time interval, tr1, the electromagnetic waves having the first wavelength 106r emitted by a light emitting device and reflected by an object 120. Each pixel element 104 in the array of pixel elements 304 is further configured to produce a second pixel image data 118 based on electromagnetic waves having a second wavelength 108r received during a second receiving time interval, tr2, the electromagnetic waves having the second wavelength 108r emitted by the light emitting device and reflected by the object 120.

The imaging device 300 further includes the image processing circuit 112 configured to produce a color image 114 of the object 120 based on the first pixel image data 116 and the second pixel image data 118 from each pixel element 104 in the array of pixel elements 304.

Due to the implementation of the array of pixel elements receiving the electromagnetic waves 106r, 108r during a first receiving time interval and a second receiving time interval respectively, a higher pixel resolution may be achieved and full color information about the object may be determined based on successive illumination or lighting of the object with different colors, for example.

The array of pixel elements 304 shown in FIG. 3 is shown illustratively as a 2×2 pixel array. It may be understood that this example is used illustratively and that the array of pixel elements 304 may include any number of pixels which may be suited for various imaging device applications. For example, the array of pixel elements may include any hundreds, thousands or tens of thousands or more pixel elements.

Pixel image data, e.g. first pixel image data 116 and second pixel image data 118, produced successively by each pixel element 104 in the array of pixel elements 304, are denoted illustratively by the dotted lines 116, 118 in FIG. 3. The image processing circuit 112 may produce the color image 114 based on the first pixel image data 116 and the second pixel image data 118 from each pixel element 104 in the array of pixel elements 304.

The image processing circuit 112 may produce a plurality of successive color images of the object based on a plurality of successive first pixel image data 116 and a plurality of successive second pixel image data 118 produced by the array of pixel elements 304. The image processing circuit 112 may combine the plurality of successive color images to produce a final color image 114.

More details and aspects are mentioned in connection with embodiments described above or below (e.g. regarding the imaging device, the image sensor circuit, the pixel element, the pixel image data and the image processing circuit). The embodiment shown in FIG. 3 may comprise one or more optional additional features corresponding to one or more aspects mentioned in connection with the proposed concept or one or more embodiments described above (e.g. FIG. 1 or 2) or below (e.g. FIG. 4).

In some embodiments, the implementations described herein may be arranged in a TOF camera, as the TOF camera functions using actively emitted modulated visible infra-red light. In other words imaging device 100, 300 may be configured as a TOF camera, e.g. a TOF sensor 3D camera. Color images and three-dimensional color images may be produced using the implementations, instead of producing images carrying only brightness information in infra-red and distance information.

In other embodiments, imaging device 100, 300 may be configured as a camera to produce two-dimensional color images and alternatively or additionally three-dimensional images.

Figure 4:
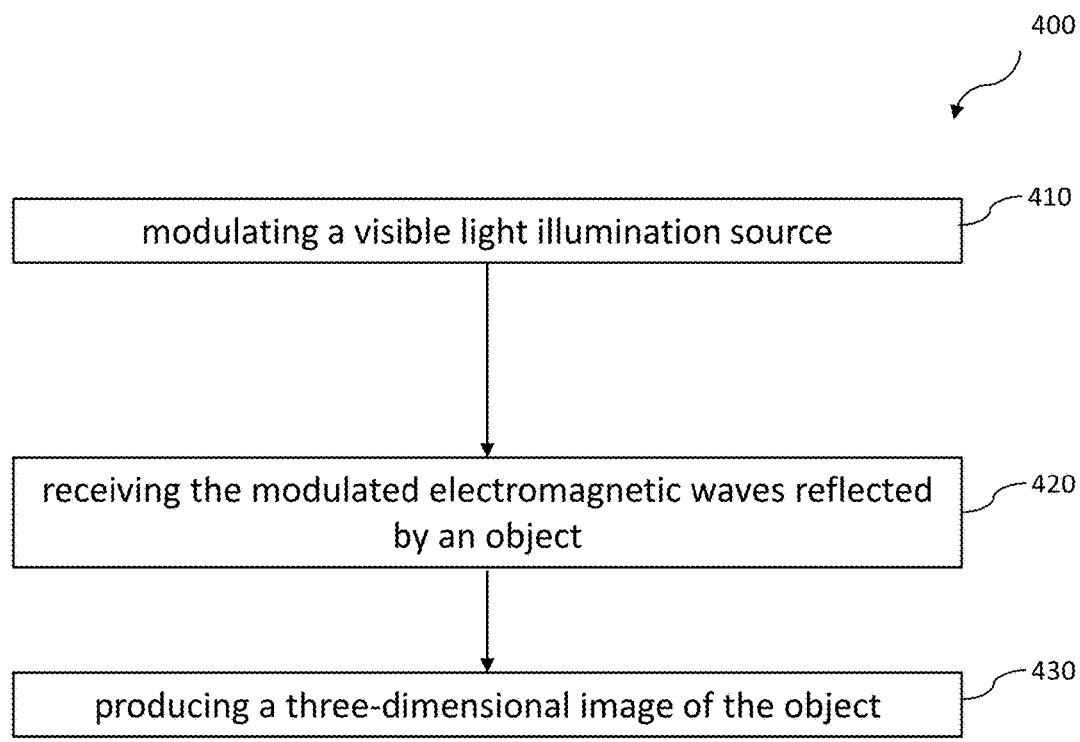
FIG. 4 shows a flow chart of a method for producing a three-dimensional image according to various embodiments.

FIG. 4 shows a flow chart of a method for producing a three-dimensional image according to various embodiments. The method includes modulating a visible light source external to a time of flight camera to emit modulated electromagnetic waves based on a modulation control signal generated by the time of flight camera.

The method further includes receiving by the time of flight camera the modulated electromagnetic waves reflected by an object.

The method further includes producing of a three-dimensional image of the object based on the received modulated electromagnetic waves, wherein the received modulated electromagnetic waves are emitted by the visible light source and reflected by the object.

The visible light source may be an illumination source which emits visible light, i.e. electromagnetic waves having a wavelength ranging from approximately 350 nm to approximately 750 nm, which is visible to the human eye. The illumination of the object by the visible light source may improve the visibility of the object to the human eye.

The visible light source may include an immovable light source or a light source of a vehicle, speed camera or street light or a flash unit of a camera.

Due to the implementation of modulating an immovable light source or a light source of a vehicle, speed camera, or street light, active lighting is not necessarily carried out by the imaging device, for example. Therefore, a light emitting device for providing active lighting is not necessarily included in the imaging device, for example.

In some embodiments, the immovable light source may be a light source external to the camera. In one implementation, the immovable light source may be a light source of a speed camera. In another implementation, the immovable light source may be a light source from a household light, or a light fixed to a building, or a street light. In some embodiments the light source may be a light source of a vehicle.

The modulation control signal may be generated by a modulation control circuit of the imaging device (e.g. mentioned in connection with FIGS. 1, 2 and 3). The modulation control signal may be transmitted to the immovable light source or the light source of a vehicle or endoscope or a speed camera or a street light, using a wired or wireless connection. The TOF camera may include an imaging device according to one or more embodiments described above (e.g. FIGS. 1, 2 and 3). A three-dimensional image of an object based on the received modulated electromagnetic waves may be produced by the TOF camera where the received modulated electromagnetic waves are emitted by the immovable light source and reflected by the object.

Various embodiments described herein may be implemented in cameras which use active lighting for other purposes, for example in endoscopes. In some embodiments, the light source may be part of an endoscope. The modulation control signal may be transmitted to the active lighting circuit of the endoscope so that the active lighting circuit of the endoscope emits modulated electromagnetic waves. A three-dimensional image of an object based on the received modulated electromagnetic waves may be produced by the imaging device, where the received modulated electromagnetic waves are emitted by the active lighting circuit of the endoscope and reflected by the object.

More details and aspects are mentioned in connection with embodiments described above or below (e.g. regarding the imaging device, the image sensor circuit and the modulation control circuit). The embodiments described in FIG. 4 may comprise one or more optional additional features corresponding to one or more aspects mentioned in connection with the proposed concept or one or more embodiments described above (e.g. FIG. 1 or 2 or 3) or below (e.g. FIG. 5).

Figure 5:
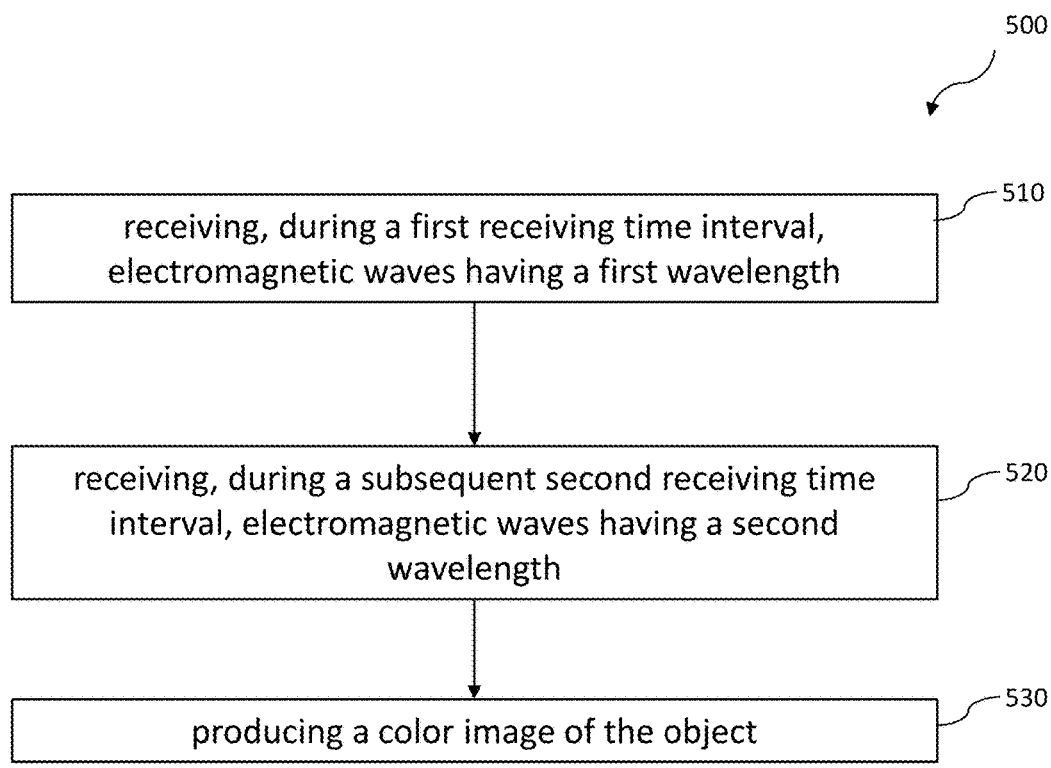
FIG. 5 shows a flow chart of a method for producing a color image according to various embodiments.

FIG. 5 shows a flow chart of a method 500 for producing a color image of an object according to various embodiments. The method 500 includes receiving 510, by a pixel element of an image sensor circuit, during a first receiving time interval electromagnetic waves having a first wavelength, the electromagnetic waves having the first wavelength emitted by a light emitting device and reflected by an object.

The method 500 further includes receiving 520, by the pixel element, during a subsequent second receiving time interval electromagnetic waves having a second wavelength, the electromagnetic waves having the second wavelength emitted by the light emitting device and reflected by the object.

The method 500 further includes producing 530, by an image processing circuit, a color image of the object based on a first pixel image data and a second pixel image data, wherein the first pixel image data is based on the electromagnetic waves having the first wavelength received by the pixel element during the first receiving time interval, and wherein the second pixel image data is based on the electromagnetic waves having the second wavelength received by the pixel element during the second receiving time interval.

Due to the implementation of the pixel element receiving the electromagnetic waves during a first receiving time interval and a subsequent second receiving time interval respectively, a higher pixel resolution may be achieved.

More details and aspects are mentioned in connection with embodiments described above (e.g. the pixel element of the image sensor circuit, and the image processing circuit). The embodiments described in FIG. 5 may comprise one or more optional additional features corresponding to one or more aspects mentioned in connection with the proposed concept or one or more embodiments described above (e.g. FIG. 1 or 2 or 3 or 4).

Various embodiments describe herein relate to RGBZ imagers. The embodiments described herein relate to obtaining color information through the sequential emission of different colors by active modulated lighting.

Processes for producing 3D color images are often complex as two or more image sensors are may be used. One image sensor may be used for producing a TOF 3D image and the other image sensor may be used for producing a color image. The TOF 3D image and the color image may be assembled electronically or merged together using algorithms which is complex and may be susceptible to errors. Errors introduced when the image sensors of the camera for the 3D image and the color image are not on the same optical axis may be avoided by a proposed systems and embodiments.

TOF sensor 3D cameras may be operated using infra-red light. Images produced may include brightness information (in infra-red) and distance information, but lack color information. Proposed systems embodiments described herein allow color information to be obtained with the distance information using a single image sensor.

Various embodiments relate to pixels without color filters. The color information may be determined through color lighting, where different colored lights may be activated consecutively to produce images. The data of the images may be sequentially assembled to produce a color picture.

In various embodiments, the unwanted background light may be suppressed, whereby the color lighting may be modulated and may be synchronized in a PMD with the modulation of the channel. The color information may be determined from the difference in the data of the channels.

In order to produce a high contrast, low noise brightness image in a further image acquisition mode, the suppression of background light may be avoided. This may be carried out with the active lighting and exclusive use of background light as described in proposed systems and embodiments.

Various embodiments described herein may be implemented in ordinary cameras for the production of color information. Various embodiments described herein may be implemented in TOF cameras, which use actively emitted modulated visible or infra-red light. The determination of color information may be carried out using proposed systems, methods and embodiments without adding any extra complications or complexities.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . ." (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure.

Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. An imaging device comprising:
   an image sensor circuit comprising a pixel element, wherein the pixel element is configured to receive during a first receiving time interval electromagnetic waves having a first wavelength corresponding to solely a first color of visible light, the electromagnetic waves having the first wavelength emitted by a light emitting device and reflected by an object, and to receive during a subsequent second receiving time interval electromagnetic waves having a second wavelength corresponding to solely a second, different color of visible light, the electromagnetic waves having the second wavelength emitted by the same light emitting device and reflected by the object, wherein the first wavelength and the second wavelength are different wavelengths such that the pixel element is configured to receive electromagnetic waves in different wavelengths in separate time intervals; and
   an image processing circuit configured to produce a color image of the object based on a first pixel image data and a second pixel image data, wherein the first pixel image data is based on the electromagnetic waves having the first wavelength received by the pixel element during the first receiving time interval, and wherein the second pixel image data is based on the electromagnetic waves having the second wavelength received by the pixel element during the second receiving time interval.

2. The imaging device according to claim 1, further comprising a light emitting device configured to emit during a first emitting time interval the electromagnetic waves having the first wavelength and during a subsequent second emitting time interval the electromagnetic waves having the second wavelength.

3. The imaging device according to claim 1, wherein the electromagnetic waves having the first wavelength comprise visible light of the first color, and wherein the electromagnetic waves having the second wavelength comprise visible light of the second color.

4. The imaging device according to claim 1, wherein the pixel element is configured to receive during the first receiving time interval the electromagnetic waves having the first wavelength and during the subsequent second receiving time interval the electromagnetic waves having the second wavelength at a same electromagnetic wave receiving area of the pixel element.

5. The imaging device according to claim 1, wherein the pixel element comprises an electromagnetic wave receiving area, wherein the electromagnetic wave receiving area defines the smallest unit area used by the image sensor circuit for obtaining the first pixel image data and the second pixel image data.

6. The imaging device according to claim 1, wherein the image sensor circuit comprises a number of pixel elements used for obtaining pixel image data for the produced color image of the object equal to a number of pixels of the produced color image of the object.

7. An imaging device comprising:
   an image sensor circuit comprising a pixel element, wherein the pixel element is configured to receive during a first receiving time interval electromagnetic waves having a first wavelength corresponding to a first color, the electromagnetic waves having the first wavelength emitted by a light emitting device and reflected by an object, and to receive during a subsequent second receiving time interval electromagnetic waves having a second wavelength corresponding to a second, different color, the electromagnetic waves having the second wavelength emitted by the light emitting device and reflected by the object; and
   an image processing circuit configured to produce a color image of the object based on a first pixel image data and a second pixel image data, wherein the first pixel image data is based on the electromagnetic waves having the first wavelength received by the pixel element during the first receiving time interval, and wherein the second pixel image data is based on the electromagnetic waves having the second wavelength received by the pixel element during the second receiving time interval,
   wherein the pixel element is further configured to receive during a third receiving time interval ambient light reflected by the object, and wherein the image processing circuit is further configured to produce the color image or an additional brightness image of the object based on third pixel image data, wherein the third pixel image data is based on the ambient light reflected by the object and received by the pixel element,
   wherein the image processing circuit further comprises a circuit configured to produce the color image of the object based on a subtraction of the third pixel image data from the first pixel image data and the second pixel image data.

8. The imaging device according to claim 7, wherein the image processing circuit is configured to produce the color image based on intensity information of the first pixel image data and intensity information of the second pixel image data.

9. The imaging device according to claim 7, wherein the image processing circuit is configured to produce the color image or an additional three-dimensional image based on distance information of the first pixel image data, wherein the distance information of the first pixel image data is based on a phase delay between the electromagnetic waves having the first wavelength emitted during a first emitting time interval by a light emitting device and the electromagnetic waves having the first wavelength received during the first receiving time interval.

10. The imaging device according to claim 7, wherein the image processing circuit comprises a modulation control circuit configured to provide a modulation control signal to a light emitting device emitting the electromagnetic waves having the first wavelength and the electromagnetic waves having the second wavelength for controlling a modulation of the electromagnetic waves having the first wavelength and the electromagnetic waves having the second wavelength.

11. The imaging device according to claim 7, wherein the image processing circuit comprises a lock-in amplifying circuit configured to obtain intensity information of the first pixel image data based on the first pixel image data and a modulation control signal used for controlling a modulation of the electromagnetic waves having the first wavelength emitted by a light emitting device and the electromagnetic waves having the second wavelength emitted by a light emitting device.

12. The imaging device according to claim 7, wherein the image processing circuit is configured to determine intensity information and distance information of the first pixel image data based on an auto-correlations function.

13. The imaging device according to claim 7, further comprising an infra-red emitting circuit configured to emit during a further emitting time interval infra-red electromagnetic waves, wherein the pixel element is configured to receive during a further receiving time interval infra-red electromagnetic waves emitted by the infra-red emitting circuit and reflected by an object, and wherein the image processing circuit is configured to produce the color image or an additional three-dimensional image based on pixel distance image data, wherein the pixel distance image data is based on the infra-red electromagnetic waves received by the pixel element during the further receiving time interval.

14. The imaging device according to claim 7, wherein the electromagnetic waves having the first wavelength and the electromagnetic waves having the second wavelength are received by the pixel element through a common light path.

15. The imaging device according to claim 14, wherein the common light path is passable to electromagnetic waves of the first wavelength and the electromagnetic waves of the second wavelength during the first receiving time interval and the second receiving time interval.

16. The imaging device according to claim 7, wherein the pixel element is one in an array of pixel elements comprised by the image sensing circuit, wherein the image processing circuit is configured to produce the color image based on first pixel image data and second pixel image data from each pixel element in the array of pixel elements.

17. The imaging device according to claim 16, wherein the image processing circuit is configured to produce a plurality of successive color images of the object based on a plurality of successive first pixel image data and a plurality of successive second pixel image data produced by the array of pixel elements, and wherein the image processing circuit is configured to combine the plurality of successive color images to produce a final color image.

18. A method for producing a color image of an object, the method comprising:
receiving, by a pixel element of an image sensor circuit, during a first receiving time interval electromagnetic waves having a first wavelength corresponding to solely a first color, the electromagnetic waves having the first wavelength emitted by a light emitting device and reflected by an object;
receiving, by the pixel element, during a subsequent second receiving time interval electromagnetic waves having a second wavelength corresponding to solely a second, different color, the electromagnetic waves having the second wavelength emitted by the light emitting device and reflected by the object;
receiving, by the pixel element, during a third receiving time interval ambient light reflected by the object; and
producing, by an image processing circuit, a color image of the object based on a first pixel image data and a second pixel image data, wherein the first pixel image data is based on the electromagnetic waves having the first wavelength received by the pixel element during the first receiving time interval, and wherein the second pixel image data is based on the electromagnetic waves having the second wavelength received by the pixel element during the second receiving time interval, and wherein further producing the color image or an additional brightness image of the object is based on third pixel image data based on the received ambient light, and subtracting the third pixel image data from the first and second pixel image data.

* * * * *

UNITED STATES PATENT AND TRADEMARK OFFICE
CERTIFICATE OF CORRECTION

PATENT NO. : 10,237,534 B2
APPLICATION NO. : 14/324327
DATED : March 19, 2019
INVENTOR(S) : Offenberg Page 1 of 1

It is certified that error appears in the above-identified patent and that said Letters Patent is hereby corrected as shown below:

On the Title Page

Replace "Assignee" from "Infineon Technologies AG, Neublberg (DE)" with -- Infineon Technologies Dresden GmbH & Co. KG, Dresden (DE) --

Signed and Sealed this
Thirtieth Day of July, 2019

Andrei Iancu
*Director of the United States Patent and Trademark Office*